(12) United States Patent
Cook

(10) Patent No.: US 7,197,038 B1
(45) Date of Patent: Mar. 27, 2007

(54) INTERNETWORK QUALITY OF SERVICE PROVISIONING WITH RECIPROCAL COMPENSATION

(75) Inventor: Fred S. Cook, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1069 days.

(21) Appl. No.: 10/274,741

(22) Filed: Oct. 21, 2002

(51) Int. Cl.
*H04L 12/54* (2006.01)

(52) U.S. Cl. ................................. 370/400; 370/401

(58) Field of Classification Search ............. None
See application file for complete search history.

(56) References Cited

U.S. PATENT DOCUMENTS

| 5,461,611 | A | * | 10/1995 | Drake et al. ............... 370/420 |
| 6,144,727 | A | * | 11/2000 | Mashinsky ............. 379/114.02 |
| 6,426,955 | B1 | | 7/2002 | Gossett Dalton, Jr. et al. |
| 6,775,267 | B1 | * | 8/2004 | Kung et al. ................. 370/352 |
| 2002/0116655 | A1 | | 8/2002 | Lew et al. |

FOREIGN PATENT DOCUMENTS

| WO | WO 01/31857 | 5/2001 |
| WO | WO 02/09494 | 2/2002 |

OTHER PUBLICATIONS

Liz McPhillips, *Internet Resources by the Slice*, Mar. 5, 2002.

\* cited by examiner

*Primary Examiner*—Doris H. To
*Assistant Examiner*—Robert W. Wilson

(57) ABSTRACT

Financial reciprocal compensation is provided for a predetermined Quality of Service (QoS) managed service path including various providers in an internetwork (such as the Internet). A user requests access to one or more of the services or resources advertised by a portal that employ the predetermined QoS (such as digital multimedia or Internet telephony). After the request is validated, the portal transmits a request to a primary QoS regulation server to determine the path segments required to deliver the service at the predetermined QoS level. If capable segments are available, the primary QoS regulation server will setup QoS regulation in its domain and request QoS regulation from the QoS regulation servers managing any other required segments in other domains (e.g., networks). After completing the setup, the primary QoS regulation server replies back to the portal with a success indication and an identification of an entry point to the QoS-regulated path. The portal then signals the service or resource to start. When the service has successfully started, the service usage is logged. When the service is terminated, the usage logs are updated and the primary QoS regulation server releases its QoS regulated path segments and in turn signals all secondary QoS regulation servers to release their service related capacity. The usage logs are then used to support a settlement system which collects payments from the user or the service provider, and which provides respective portions of the total compensation to the various financial entities that provided the QoS-regulated path segments.

10 Claims, 5 Drawing Sheets

INTERNETWORK QUALITY OF SERVICE PROVISIONING WITH RECIPROCAL COMPENSATION

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to providing computer network communication links at a predetermined quality of service (QoS), and, more specifically, to financial compensation for different parts of an internetwork carrying the predetermined QoS traffic.

TCP/IP-based networks and internetworks such as the Internet utilize packet-based communication wherein the digital data comprising a communication signal are broken into packets which are labeled with a destination address, forwarded via routers over shared pathways to the destination, and then reassembled at the destination into the original data. Well known shortcomings of packet-based networks are the congestion, dropped packets, and long latency times that occur when the amount of network traffic approaches the bandwidth capacity of the network. Long latency times are especially a problem for certain real-time applications such as streaming multimedia and Internet telephony.

To address these shortcomings, network protocols and standards have been defined for allowing a predetermined quality of service (QoS) to be maintained between two nodes in a network. For example, dedicated routers and routing segments can be set aside to handle a special subset of network traffic so that the dedicated segments are not overloaded. Alternatively, portions of the available bandwidth on particular segments may be devoted to specific users so that a predetermined QoS (e.g., a maximum latency or time delay for transmission) can be guaranteed for the specific users (i.e., the dedicated bandwidth remains unused when the specific users are not transmitting or receiving). Certain types of virtual private networks (VPNs) can be set up in order to provide a guaranteed QoS, for example. Protocols developed as tools for enabling differentiated QoS transport include Resource Reservation Protocol (RSVP), Multi-Protocol Label Switching (MPLS), and Diffserv.

Providing a predetermined level of QoS causes a network provider to incur increased costs for added hardware resources and/or for underutilization of existing hardware resources. Equipment may often need to be replaced in order to support new protocols such as RSVP or MPLS. In an internetwork (e.g., the Internet), data transmissions frequently pass from one access network (e.g., the Internet service provider of one user) to another access network (e.g., the host of a website or other service or application) through one or more backbone networks which may all be owned and operated as separate financial entities. The user typically pays flat-rate access fees to their access network which, in turn, purchases usage on a backbone network. In order to gain access to a commercial website, service, or network application, the user may also have to make arrangements with a remote service provider to pay for the access (e.g., purchasing a video movie to be received as streaming multimedia over the Internet after providing a credit card number).

When a user wishes to communicate with a desired remote service while maintaining a predetermined QoS, every segment in the data path between the user and the desired service must maintain the predetermined QoS (including any backbone networks and any routing arbiter or network access points for exchanging traffic between networks). The many separate networks traversed by the data path are likely to include networks operated by separate entities. Consequently, network communication links operating at a predetermined QoS between endpoints in unrelated (i.e., not commonly controlled) networks have not become widely available. Such QoS-regulated links are typically limited to those that are set up at a network operator level and either 1) work only when both endpoints are within the same network, or 2) are set up by advance agreement between operators of the networks involved to allow predetermined QoS service between two specifically identified endpoints (such as in a VPN).

Tiered pricing (i.e., paying increased fees for higher QoS capabilities) and usage-based billing are becoming more common in Internet service models. However, users have still not been able to flexibly or spontaneously obtain higher QoS service on an as-needed basis with any QoS-capable services on-the-fly.

SUMMARY OF THE INVENTION

The present invention has the advantage of providing incentive to operators of all data communication path segments to provide predetermined QoS capability by controlling the provisioning of predetermined QoS resources in a manner to facilitate financial compensation for providing the capability.

In one aspect of the invention, a computer internetwork provides transport at a predetermined quality of service (QoS). A first access network provides an access point for a user, wherein the first access network includes a first QoS regulation server for making path segments available within the first access network at the predetermined QoS. A resource within a resource provider network is connected within the internetwork and supports interaction with the user at the predetermined QoS. A backbone network is coupled to the first access network and the resource provider network, wherein the backbone network includes a backbone QoS regulation server for making path segments available within the backbone network at the predetermined QoS. A QoS service portal is responsive to a request from the user or the resource provider network for a communication link between the user and the resource, wherein said QoS service portal validates the requester initiating the request and, if the requester is validated, then sends a request to a QoS regulation server within the internetwork for the generation of a QoS-regulated service path between the user and the resource. The requested QoS regulation server responds to the generation request from the QoS service portal to 1) identify a group of networks containing needed path segments to generate the QoS-regulated service path, 2) reserve any path segments over which is has regulatory control, 3) contact corresponding other QoS regulation servers to reserve path segments in their corresponding networks, and 4) notify the QoS portal of the communication link. A log records usage of the path segments. A settlement system is coupled to the log for initiating collection from at least one of the user or the resource provider network in response to the recorded usage and initiating compensation to at least the backbone network in response to the location of the path segments corresponding to the recorded usage.

DETAILED DESCRIPTION OF PREFERRED EMBODIMENTS

Figure 1:
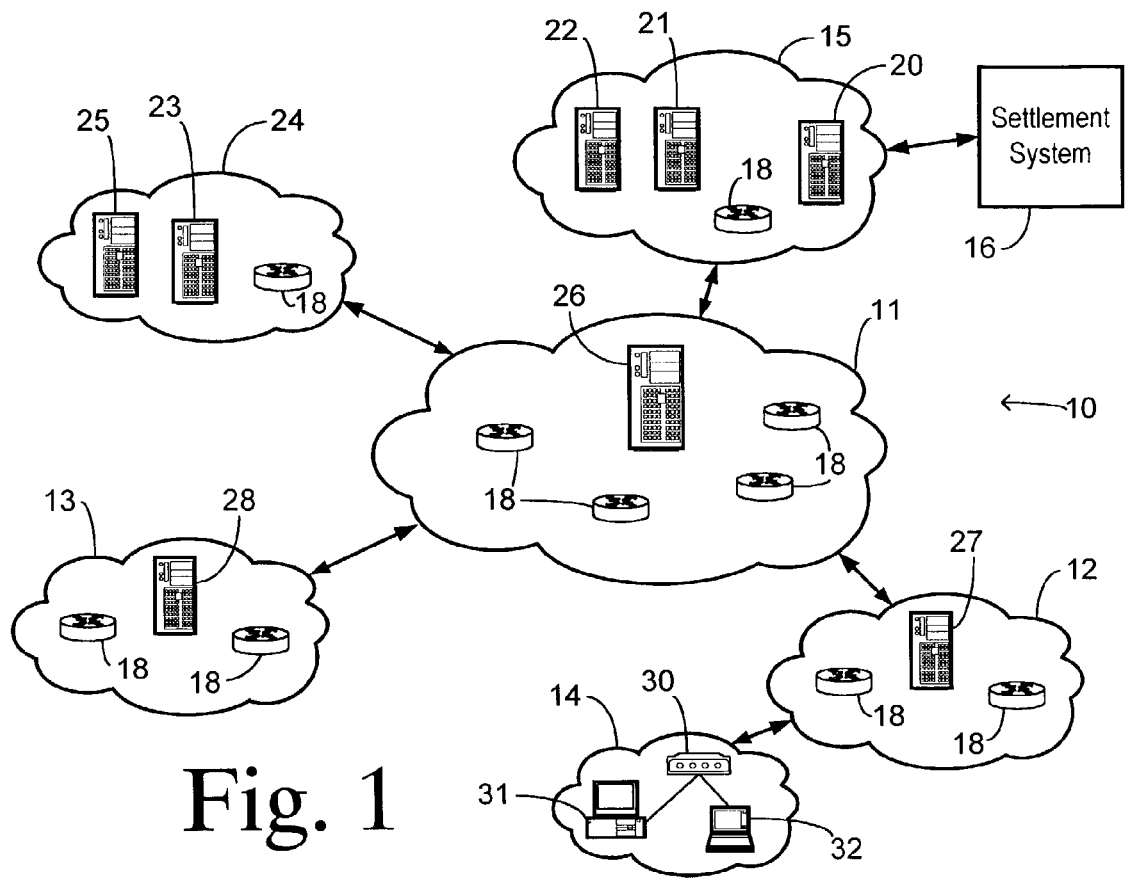
FIG. 1 is a block diagram showing an internetwork employing the QoS regulated service and reciprocal compensation of the present invention.

The present invention is comprised of a process for providing financial reciprocal compensation for a QoS managed service path including various providers in an internetwork. In one typical embodiment, the process starts when a service (i.e., resource), or group of services, is advertised to potential users in the internetwork (e.g., via a portal). When a user requests access to one or more of the services or resources advertised, a QoS-regulated path generation request is forwarded to the advertisement/acceptance portal which validates the request to identify a party responsible for paying for the use of the QoS-regulated path. The portal provides a grouping, sorting, aggregating, and/or translating function for a logical group of users, and a web browser may be used to display a menu corresponding to the portal. A Java-based order form, cgi script, or other existing web mechanisms can be employed in portal software running on one or more servers. By way of example, the advertisement/acceptance portal may offer a links to streaming multimedia delivery of a movie. A user selects a movie and is validated by the portal (e.g., a user ID and password are collected and the user provides a payment authorization, such as providing a credit card number).

If the path generation request is validated, the portal transmits a request to a primary QoS regulation server to determine the path segments required to deliver the service at the predetermined QoS level. The request message to the primary QoS regulation server may preferably include details on 1) any limitations on pricing or duration associated with the service, and 2) any desired QoS characteristics such as desired maximum latency time. If capable segments are available, the primary QoS regulation server will setup QoS regulation in its domain and request QoS regulation from the QoS regulation servers managing any other required segments in other domains (e.g., networks). If capable segments are not available, failure messages are sent to the advertise/acceptance portal and to the requester (e.g., user and/or service provider).

If the predetermined QoS capabilities are available, the primary QoS regulation server will reply back to the advertise/acceptance portal with a success indication and a path identifier (such as an MPLS label) that can be used to direct traffic to the QoS-regulated path. The reply may also include information on actual aggregate pricing, actual duration constraints, and actual aggregate QoS characteristics (which may involve temporarily linking in of QoS path verification test equipment). The advertise/acceptance portal will then signal the service or resource to start (and it may also reply to the user with a path identifier for accessing the QoS-regulated path at the user's end). When the service has successfully started, it will signal the advertise/acceptance portal and the service usage will be logged. When the service is complete, it signals the advertise/acceptance portal and the primary QoS regulation server. The primary QoS regulation server releases its QoS regulated path segments and in turn signals all secondary QoS regulation servers to release their service related capacity. After releasing the path segments, the primary regulation server signals the advertise/acceptance portal, which logs the end of usage. The usage logs in the advertise/acceptance portal are then used to support a settlement system which collects payments from the user or service provider on the one hand, and which provides respective portions of the total compensation to the various financial entities that provided the QoS-regulated path segments (including the backbone network) on the other hand. In the previous example with streaming multimedia delivery of a movie where the service provider generates revenue from end users, the settlement ID would identify the service provider as the party responsible for providing compensation to other networks for the QoS service.

Referring to FIG. 1, an internetwork 10, such as the Internet, includes a backbone network 11 connected to access networks 12 and 13. The various networks shown in FIG. 1 include routers 18 for directing network packets between their sources and destinations. Access network 12 may comprise an Internet service provider (ISP) for an individual user connecting from customer premises equipment 14. Equipment 14 may comprise a single computer and modem or may include a local area network (LAN) with multiple computers interconnected.

A network 15 coupled to backbone 11 includes an advertise/acceptance portal 20 (referred to hereafter as QoS service portal 20) which communicates with a settlement system 16. QoS service portal 20 offers QoS-enabled services or resources and manages the establishment, management, and compensation for internetwork communication links providing a predetermined level of QoS. The advertised resource made available at the high QoS level may include delivery of multimedia content (e.g., streaming video movies), IP telephony, or video conferencing, for example. The resource may reside on a resource server 21 in the same network as QoS service portal 20 or may reside in a different network, such as a resource server 23 in a network 24 which is accessible via backbone network 11.

Each network through which a QoS-regulated path segment is needed contains a QoS regulation server (or may be controlled by a QoS regulation server in another network) to generate the network settings (e.g., reservations) for the segments. Thus, QoS regulation servers 22 and 25 are located in networks 15 and 24, respectively, for implementing path segments within their respective networks for coupling resource servers 21 or 23 to other networks (e.g., to backbone network 11) at the predetermined QoS level. A QoS regulation server 26 controls QoS-regulated path segments within backbone network, and QoS regulation servers 27 and 28 control path segments in access networks 12 and 13, respectively.

Customer premises equipment (CPE) 14 is shown as a LAN including a modem/router 30 connected with endpoint devices 31 and 32 which may be comprised of computers, set-top boxes, game systems, audio systems, or other equipment capable of operating in a computer network. In the present invention, the LAN must also support the predetermined QoS capacity in order to be able to guarantee the performance level desired by the user at device 31 or 32.

The QoS regulation server to which QoS service portal 20 issues a request for creation of a QoS-enabled communication link is referred to herein as the primary QoS regulation server. The primary server is responsible for determining a potential route through networks or domains between the desired endpoints and for contacting all the appropriate other (i.e., secondary) QoS regulation servers in the other domains to establish a continuous QoS-enabled path. In one preferred embodiment, QoS regulation server 26 in backbone network 11 is the primary QoS regulation server because of its centralized location with respect to most of the other regulation servers. Nevertheless, any QoS regulation server can perform the primary server functions, and not all end users need be serviced by the same primary QoS regulation server.

Figure 2:
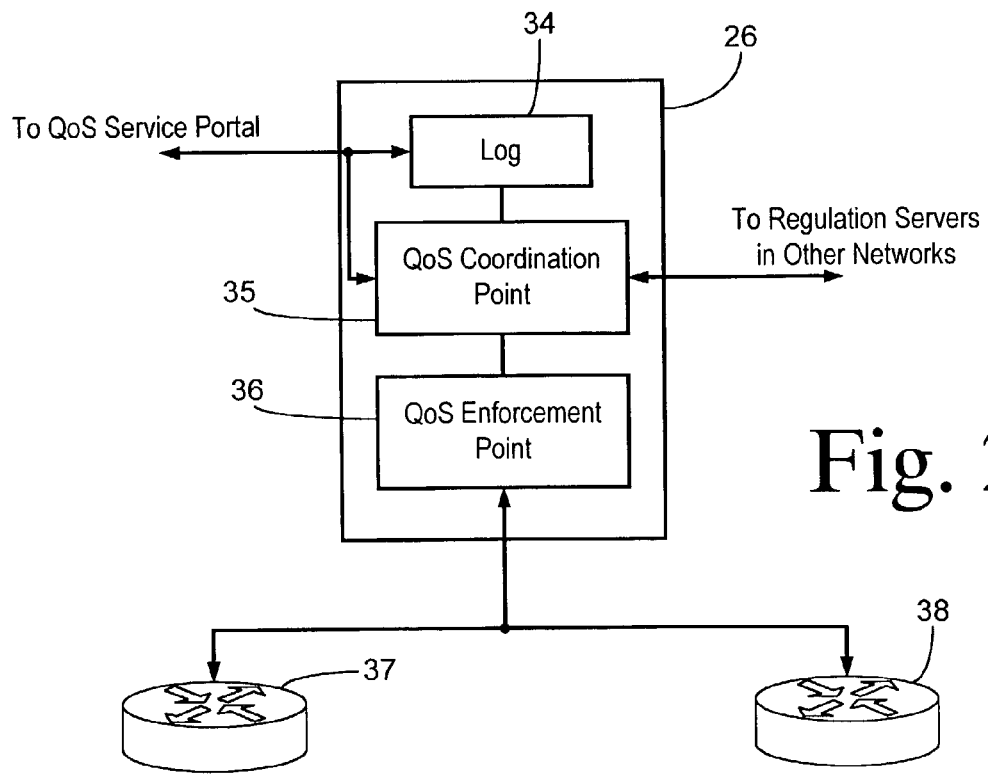
FIG. 2 is a block diagram showing a QoS regulation server in greater detail.

As shown in FIG. 2, QoS regulation server 26 performs separate functions of a QoS coordination point 35 and a QoS enforcement point 36. These functions are preferably performed within the same server device as shown, but could also be implemented in separate devices within the same network.

Coordination point 35 manages the generation of path segments. It first ensures that a request for a segment is authorized. If coordination point 35 is functioning as the primary QoS regulation server, then it authenticates in conjunction with the QoS service portal. If coordination point 35 is functioning as a secondary QoS regulation server, then the primary must authenticate to it before it will process any requests. If coordination point 35 is the primary QoS regulation server, then it is also responsible for identifying all the transport networks that are needed to establish the complete QoS link between the endpoints provided by the request from the QoS portal and then coordinating with the secondary QoS regulation servers to first establish and then release the QoS-regulated path segments. All the QoS regulation servers also maintain a usage log 34 so that each network can reconcile the usage it has supplied with the compensation it eventually receives based on the accounting and settlement process initiated in conjunction with the QoS service portal.

Enforcement point 36 communicates with network elements such as routers 37 and 38 within the domain of server 26 to actually create a requested QoS-regulated path segment. Enforcement point 36 may be comprised of known network traffic management tools, such as the Consious™ traffic engineering system from Zvolve Systems, Inc., or an aggregation of other existing tools for policy management, proxy signaling, or other similar mechanisms.

Figure 3:
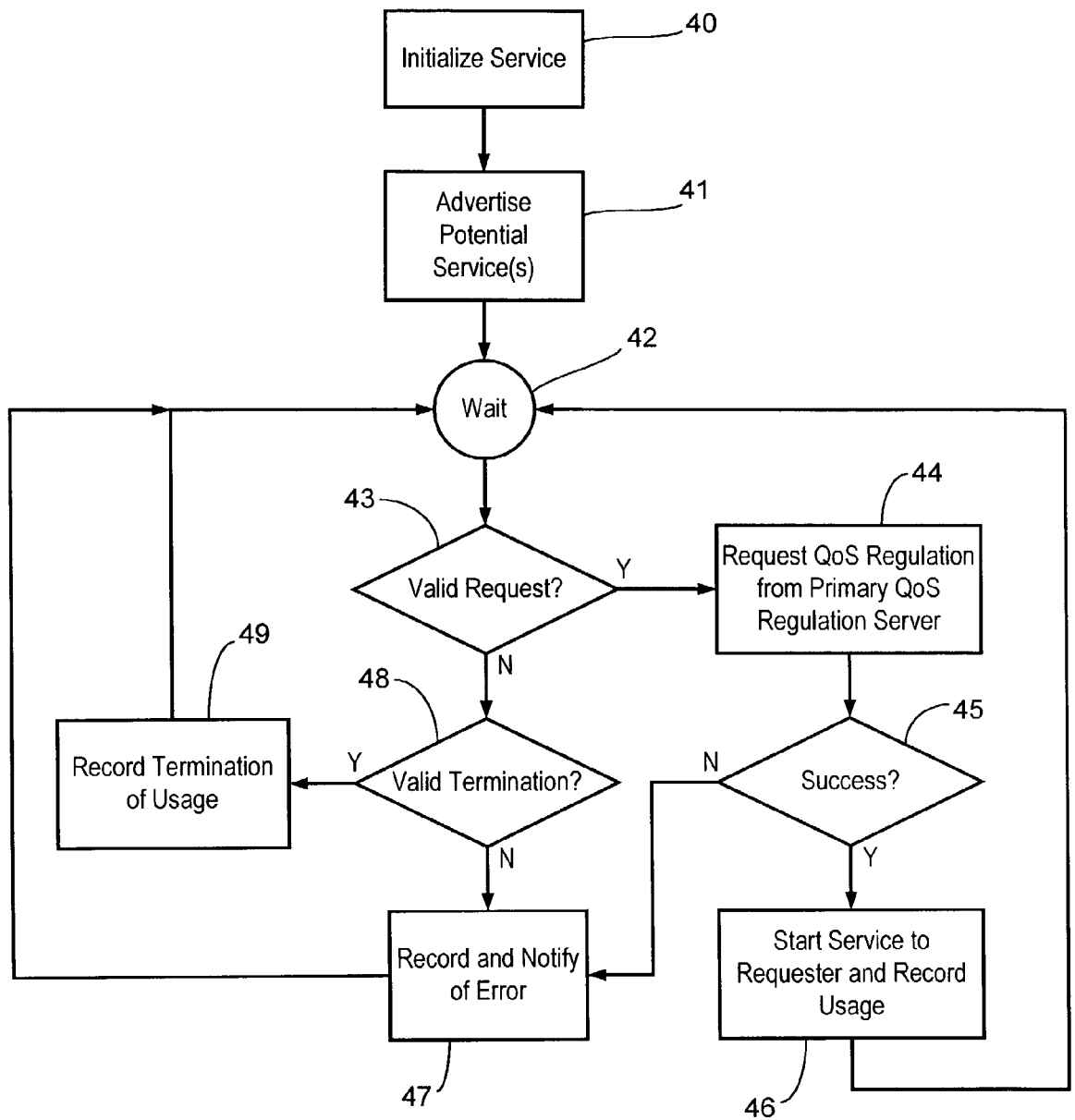
FIG. 3 is a flowchart showing a preferred method of operating a service portal.

FIG. 3 shows a preferred embodiment for a QoS service portal offering a QoS enabled service, wherein a user typically may be charged a usage-based fee for accessing the service. The service is initialized with the desired service capabilities (e.g., set-up of multimedia content and a portal interface) in step 40. In step 41, the QoS service portal advertises the potential services available. For example, freely accessible web pages describing the potential services with links to initiate the respective services are created which can be viewed by Internet users with a browser. In step 42, the QoS service portal waits for network traffic activity such as a request for a particular service.

In step 43, incoming traffic is checked to determine whether it corresponds to a valid request for connection with a QoS-enabled service. When incoming traffic is in the form of a request, then the determination of validity includes validation (i.e., authentication and authorization) of the user via a user ID and password as well as a billing account identification or a credit card number, for example. If the requesting user is validated, then the QoS service portal sends a request for QoS regulation to its primary QoS regulation server in step 44 and waits for confirmation that a QoS regulated path has been established. A check is made in step 45 to determine whether the path has been created and any necessary parameters (e.g., origination router, special IP addresses, or an MPLS label) needed to direct traffic to that path have been received. If successful, then the requested service is started in step 46 and the usage is recorded. Recording of usage may preferably include the service type or resources used, the settlement ID, and the time duration of the usage. If not successful in step 45, then the occurrence of an error is recorded and an error message is sent to the requesting user in step 47 to notify them that a QoS regulated path was not available. The QoS service portal returns to its wait state in step 42.

If incoming traffic is not a valid request in step 43, then a check is made in step 48 to determine whether the traffic corresponds to a valid termination of a current QoS-regulated communication link. Valid termination messages may be generated by a user when the service is no longer desired, by the service itself if it reaches a completion, or by a network element (e.g., a QoS regulation server) if it becomes unable to maintain a QoS-regulated path segment. If a valid termination, then the termination of usage is recorded in step 49 and the method returns to step 42. If the incoming traffic was neither a valid request nor a valid termination, then an error is recorded and notified in step 47.

Figure 4:
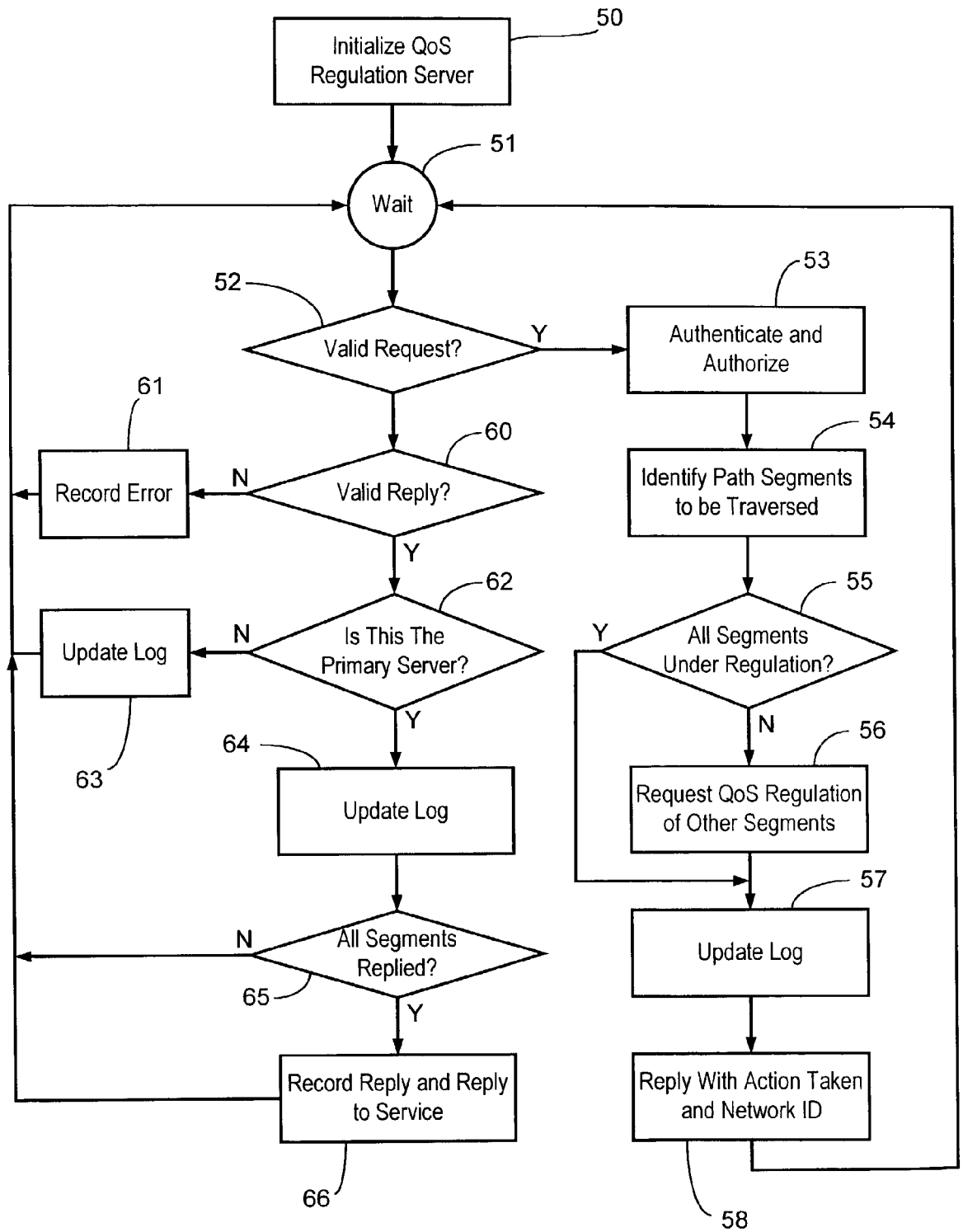
FIG. 4 is a flowchart showing a preferred method of operating a QoS regulation server.

A preferred method of operation for a QoS regulation server is shown in FIG. 4. The QoS regulation server is initialized in step 50 and then waits for network traffic to be processed in step 51. Incoming traffic is checked in step 52 to determine whether it is a valid request for a QoS-regulated segment within a domain which is under the control of the QoS regulation server. If the request is valid, then the requesting network element (e.g., the QoS service portal or a primary QoS regulation server in another network) is checked for authentication and authorization in step 53. In step 54, the path segments to be traversed are identified based on endpoints provided in the request. A check is made in step 55 to determine whether all the needed segments can be regulated by this QoS regulation server. If all segments are under regulation by this QoS regulation server, then enforcement of the predetermined QoS is initiated for the segments. If not all segments may be regulated from this QoS regulation server, then the identities of the QoS regulation servers in other domains are determined in step 56 and requests are sent to those other QoS regulation servers. In step 57, the QoS regulation server updates a status log for storing status information related to each path segment.

In step 58, the QoS regulation server replies to the requester (e.g., the QoS service portal or a primary QoS regulation server) to confirm the action taken and providing any necessary network ID (e.g., an MPLS label) or other parameters to utilize any QoS-regulated path segments that were set up. If this is the primary QoS regulation server and all necessary segments are under its regulation, then a success message is also sent to the QoS service portal.

If incoming traffic was not a valid request in step 52, then a check is made in step 60 to determine whether it is a valid reply to a request sent earlier to another QoS regulation server or to a regulated network element (e.g., a router). If not, then an error is recorded in step 61. Otherwise, a check is made in step 62 whether this is the primary QoS regulation server. If not, then the reply (which in that case would be from a regulated network element) is logged in step 63. If all needed network elements have replied and are now successfully regulated, then a reply also is sent to the primary QoS regulation server.

If this is the primary QoS regulation server, then the current reply is logged in step 64. A check is made in step 65 to determine whether all path segments (i.e., both all the secondary QoS regulation servers and the network elements directly regulated by the primary QoS regulation server) have sent successful reply messages. If not, then a return is made to step 51 to wait for additional replies. If all successful replies have been received, then a reply is sent to the QoS service portal in step 66.

Figure 5:
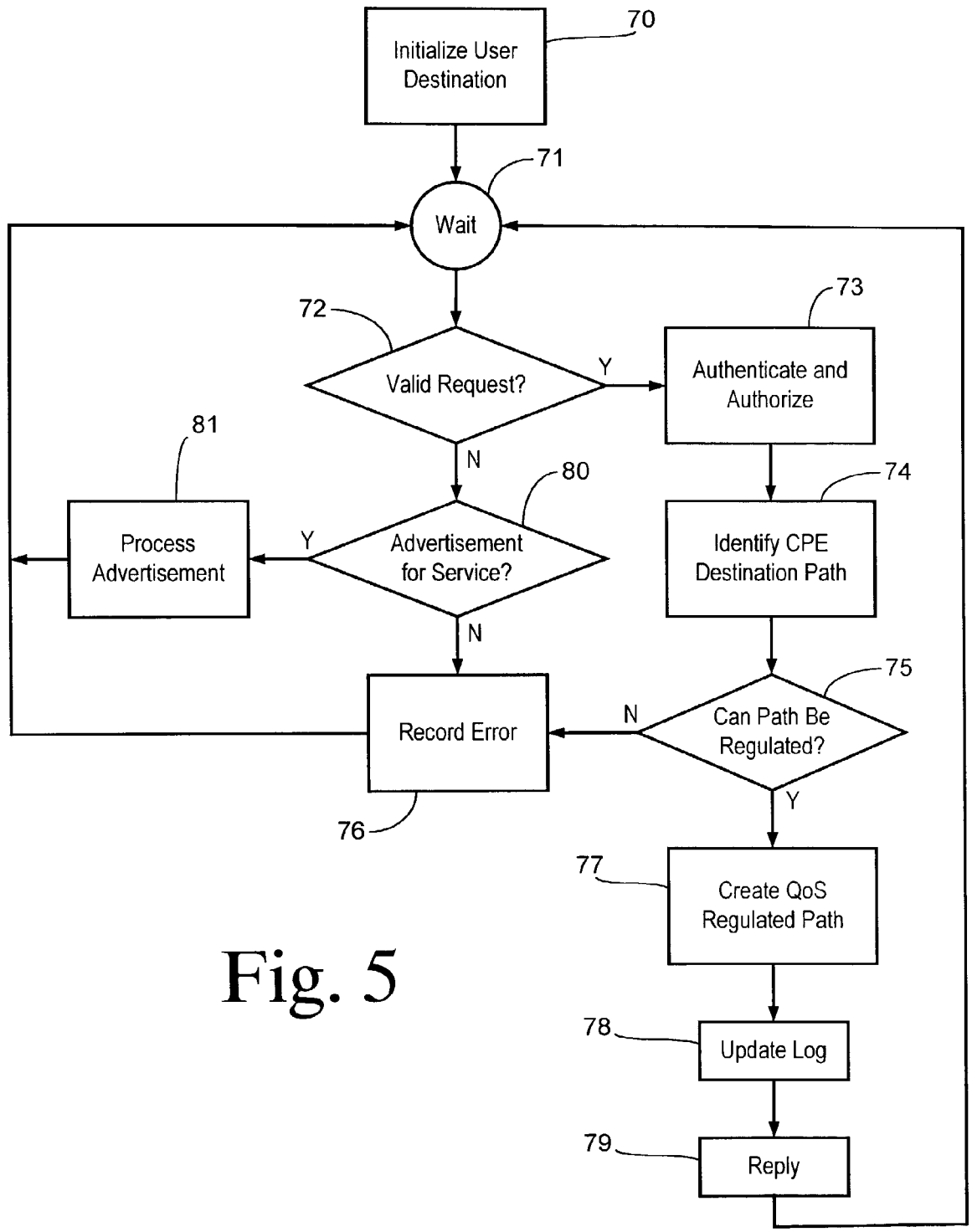
FIG. 5 is a flowchart showing a preferred method of operating customer premises equipment when the user is part of a local area network.

In the event that the requesting user is connected within a LAN, then the maintenance of the predetermined QoS within the customer premises equipment (CPE) becomes an issue. FIG. 5 illustrates a preferred method for operating a user's computer to ensure the predetermined QoS performance within a LAN. The user destination computer is initialized in step 70 (e.g., a software program is launched for accessing the services of the present invention) and waits for activity in step 71. Incoming traffic directed to the user (e.g., to the software program) is checked in step 72 to determine whether it is an incoming request from a primary QoS regulation server to set up a QoS-regulated path segment within the LAN. If so, then the QoS regulation server must be authenticated and authorized in step 73 pursuant to information from the QoS service portal and/or information in the user system pertaining to current requests for QoS-regulated services. If validated, then the destination computer identifies a CPE destination path within the LAN. A check is made in step 75 to determine whether this path can be successfully regulated at the predetermined QoS. If not, then an error is recorded and presented to the user in step 76 and the failure to establish the desired QoS link results in an error message to the primary QoS regulation server.

If it can be done, then a QoS-regulated path is created within the LAN in step 77. A QoS-usage log is updated in step 78 for the purposes of managing QoS usage within the LAN and to facilitate cost allocation if necessary within the LAN. A "success" message is sent to the primary QoS regulation server in step 79.

If incoming traffic is not a valid request in step 72, then it is checked to determine whether it is a service advertisement in step 80. If yes, then the advertisement is processed in step 81 by displaying the ad, storing information concerning the ad, and/or alerting a user to the presence of the ad, for example. If the incoming traffic is neither a valid request nor an advertisement, then an error is recorded in step 76 for subsequent diagnostic use.

Figure 6:
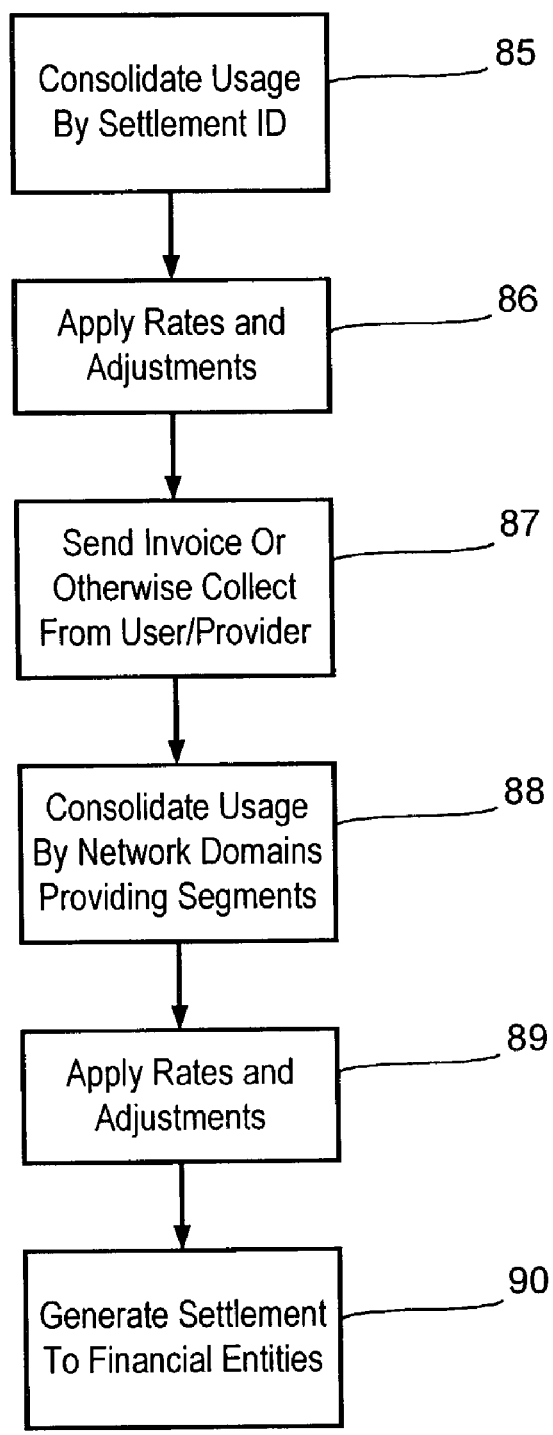
FIG. 6 is a flowchart showing a preferred settlement process.

A preferred embodiment of a settlement process used by the settlement system is shown in FIG. 6. Usage records are continuously collected when the advertised services are utilized. Periodically (e.g., monthly), the settlement process of FIG. 6 is performed to reconcile accounts receivable of settlement parties (e.g., service providers or end users) and accounts payable of network path segment suppliers (e.g., the backbone networks). In step 85, usage is consolidated according to the settlement ID. The settlement ID may be an authorized user billing ID when revenue is collected from an end user or may be a service provider ID when the service provider is the revenue generator (e.g., the service provider is paid separately by the end user). Based on the usage types and usage durations, rates and adjustments according to a predetermined pricing method are applied to the consolidated usage in step 86. An invoice is mailed or other payment collection method is performed in step 87.

In step 88, usage records are consolidated according to the network domains that provided the network segments used. Rates and adjustments are applied to the consolidated data and reciprocal compensation payments to the financial entities operating the network domains are generated in step 90.

Since each QoS regulation server maintains logs of usage, each individual financial entity (e.g. network operator) is able to verify that proper compensation is received for usage with its domain.

Many modifications of the foregoing embodiments within the scope of this invention will occur to those skilled in the art. For example, the primary QoS regulation server can perform the user authentication and authorization functions as well as maintaining the records for inputting into the settlement system.

What is claimed is:

1. A computer internetwork providing transport at a predetermined quality of service (QoS), comprising:
   a first access network providing an access point for a user, said first access network including a first QoS regulation server for making path segments available within said first access network at said predetermined QoS;
   a resource within a resource provider network connected within said internetwork, said resource supporting interaction with said user at said predetermined QoS;
   a backbone network coupled to said first access network and said resource provider network, said backbone network including a backbone QoS regulation server for making path segments available within said backbone network at said predetermined QoS;
   a QoS service portal responsive to a request from said user or said resource provider network for a communication link between said user and said resource, wherein said QoS service portal validates the requester initiating said request and, if said requester is validated, then sends a request to a QoS regulation server within said internetwork for the generation of a QoS-regulated service path between said user and said resource, wherein said requested QoS regulation server responds to said generation request from said QoS service portal to 1) identify a group of networks containing needed path segments to generate said QoS-regulated service path, 2) reserve any path segments over which is has regulatory control, 3) contact corresponding other QoS regulation servers to reserve path segments in their corresponding networks, and 4) notify said QoS portal of said communication link;
   a log for recording usage of said path segments; and
   a settlement system coupled to said log for initiating collection from at least one of said user and said resource provider network in response to said recorded usage and initiating compensation to at least said backbone network in response to the location of said path segments corresponding to said recorded usage.

2. The internetwork of claim 1 wherein said requested QoS regulation server is comprised of said backbone QoS regulation server.

3. The internetwork of claim 1 wherein each of said QoS regulation servers is comprised of a QoS coordination point and a QoS enforcement point.

4. A quality of service (QoS) regulation server connected within a domain in an internetwork, said internetwork including a first access network providing an access point for a user, a resource within a resource provider network connected within said internetwork, a backbone network coupled to said first access network and said resource provider network, and a QoS service portal responsive to a request from said user or said resource provider network for a communication link between said user and said resource, wherein said QoS service portal validates the requester initiating said request and, if said requester is validated, then sends a request to said QoS regulation server for the generation of a QoS-regulated service path between said user and said resource, said QoS regulation server comprising:
- a QoS coordination point responsive to said generation request from said QoS service portal to 1) identify a group of networks containing needed path segments to generate said QoS-regulated service path, 2) contact corresponding other QoS regulation servers to reserve path segments in their corresponding networks, and 3) notify said QoS portal of said communication link; and
- a QoS enforcement point coupled to path segments within said domain over and for reserving said path segments for said QoS-regulated service path.

5. The QoS regulation server of claim 4 further comprising a log for maintaining records of usage of said path segments.

6. A method of providing internetwork communication links having a predetermined quality of service (QoS), said method comprising the steps of:
- a particular user within a first network requesting a desired service at said predetermined QoS from a resource provider outside said first network, said first network being operated as a first financial entity and said resource provider being operated as a second financial entity;
- sending a request for a QoS-regulated path to a QoS service portal, said request including a settlement ID for identifying a party responsible for payment for said QoS-regulated path;
- a first QoS coordination point determining a plurality of path segments for delivering said desired service to said particular user, said plurality of path segments including path segments within said first network and within a backbone network, wherein said backbone network is operated as a third financial entity separate from said first and second financial entities;
- said first QoS coordination point transmitting a reservation request to a second QoS coordination point in a different one of said networks for obtaining reservation of said path segments within said different one of said networks;
- a QoS enforcement point reserving said requested path segments;
- said QoS enforcement point notifying one of said QoS coordination points of said successful reservation;
- one of said QoS coordination points signaling said resource provider to initiate said desired service;
- logging a usage initiation event of said desired service, said usage initiation event identifying said first access network, said backbone network, and said settlement ID;
- upon completion of said desired service by said particular user, logging a usage termination event corresponding to said usage initiation event;
- a collection system collecting payment from said responsible party in response to said usage events; and
- said collection system providing compensation to at least said third financial entity in response to usage of said network path segments.

7. The method of claim 6 further comprising the step of:
- advertising said desired service within said QoS service portal;
- wherein said QoS service portal accepts said request for said desired service from said user, validates said request, and requests said first QoS coordination point to generate said path segments.

8. The method of claim 6 wherein said responsible party is comprised of said second financial entity and wherein said collection system further provides compensation to said first financial entity in response to usage of said network path segments.

9. The method of claim 6 wherein said responsible party is comprised of said particular user.

10. The method of claim 9 wherein said collection system further provides compensation to said second financial entity in response to usage of said network path segments.

* * * * *